United States Patent [19]

Perry et al.

[11] Patent Number: 5,216,118
[45] Date of Patent: Jun. 1, 1993

[54] PREPARATION OF AROMATIC POLYIMIDES FROM CO, PRIMARY DIAMINE AND BIS (HALO AROMATIC CARBOXYLIC ACID ESTER)

[75] Inventors: Robert J. Perry; S. Richard Turner, both of Pittsford; Richard W. Blevins, Rochester, all of N.Y.

[73] Assignee: Eastman Kodak Company, Rochester, N.Y.

[21] Appl. No.: 841,936

[22] Filed: Feb. 25, 1992

[51] Int. Cl.$^5$ .............................................. C08G 69/00
[52] U.S. Cl. ...................................... 528/336; 528/15; 528/25; 528/33; 528/125; 528/126; 528/128; 528/168; 528/170; 528/220; 528/225; 528/229; 528/335; 528/351; 528/353; 528/391; 528/422
[58] Field of Search ............... 528/335, 336, 351, 353, 528/391, 422, 15, 25, 33, 125, 126, 128, 168, 170, 220, 225, 229

[56] References Cited

U.S. PATENT DOCUMENTS

| | | |
|---|---|---|
| 3,929,734 | 12/1975 | Bernier et al. .................... 528/336 |
| 4,621,149 | 11/1986 | Fukuoka et al. . |
| 4,868,271 | 9/1989 | Dahl et al. . |
| 4,925,916 | 5/1990 | Harris et al. . |
| 4,933,419 | 6/1990 | Perry et al. . |
| 4,933,466 | 6/1990 | Perry et al. . |
| 4,933,467 | 6/1990 | Perry et al. . |
| 4,933,468 | 6/1990 | Perry et al. . |
| 5,104,971 | 4/1992 | Perry et al. .................... 528/348 |

FOREIGN PATENT DOCUMENTS 123823  5/1989  Japan .

OTHER PUBLICATIONS

Yoneyama, M. et al., "Novel Synthesis of Aromatic Polyamides by Pd-Catalyzed Polycondensation of Aromatic Dibromides, Aromatic Diamines, and Carbon Monoxide", (1988), *Macromolecules*, vol. 21, pp. 1908-1911.

*Primary Examiner*—Harold D. Anderson
*Attorney, Agent, or Firm*—Robert Luke Walker

[57] ABSTRACT

A method for preparing polyimides comprising reacting carbon monoxide, a primary diamine and a reactant selected from the group consisting of bis(o-iodoaromatic ester)s and bis(o-bromoaromatic ester)s, in the presence of solvent and catalyst, said catalyst being a compound of a metal selected from the group consisting of platinum, palladium and nickel.

20 Claims, No Drawings

PREPARATION OF AROMATIC POLYIMIDES FROM CO, PRIMARY DIAMINE AND BIS (HALO AROMATIC CARBOXYLIC ACID ESTER)

BACKGROUND OF THE INVENTION

The present invention pertains to methods for preparing aromatic polymers. More particularly, the present invention pertains to processes for the preparation of polyimides. Polyimides are generally prepared by a method including the condensation of aromatic diamines and aromatic dianhydrides. This procedure presents the shortcoming of using moisture sensitive anhydrides. In an alternative method, bis(o-dihaloaromatic) compounds replace the dianhydrides. This avoids the problem of moisture sensitivity, but presents the shortcomings of difficulties in preparing the bis(o-dihaloaromatic) compounds and a tendency toward branching or cross-linking.

Japanese Kokai 123823, published May 16, 1989, and Yoneyama et al, Macromolecules, Vol. 21, 1988, pp. 1908–1911 disclose the use of a Heck carbonylation reaction, that is, a transition metal catalyzed carbonylation and coupling, in the preparation of low molecular weight polyamides. U.S. Pat. Nos. 4,933,419; 4,933,466 and 4,933,467 and 4,933,468 disclose methods which utilize Heck carbonylation reactions to produce esters, imides and amide-imides, respectively.

SUMMARY OF THE INVENTINO

It is an object of the invention to provide an improved method for the preparation of aromatic polyimides. In the broader aspects of the invention, there is provided a method for preparing polyimides comprising reacting carbon monoxide, a primary diamine and a reactant selected from the group consisting of bis(o-iodoaromatic ester)s and bis(o-bromoaromatic ester)s, in the presence of solvent and catalyst, said catalyst being a compound of a metal selected from the group consisting of platinum, palladium and nickel.

DESCRIPTION OF A SPECIFIC EMBODIMENT

Aromatic polyimides are very widely used as high performance plastics.

In the method of the invention, a metal-mediated carbonylation and coupling of a bis(O-(iodo or bromo)aromatic carboxylic acid ester also refered to herein as a "bis(O-(iodo or bromo)aromatic ester" and a diamine is followed by a resulting intramolecular ring closure to produce aromatic polyimide. The bis(o-(iodo or bromo)aromatic ester) has the general structure

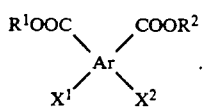

$X^1$ and $X^2$ are each independently selected from iodo and bromo.

Ar is aromatic or heteroaromatic. In a particular embodiment of the invention, Ar is an aromatic or heteroaromatic moiety having from 1 to 3, five or six membered rings. The rings are solitary or linked or fused and are substituted or unsubstituted. Suitable substituents include phenyl, halogen, disubstituted amino, alkoxy having from 1 to 6 carbon atoms, carboxylate, and alkyl groups of desirably, from 1 to 6 carbon atoms, or more desirably, from 1 to 4 carbon atoms. Linked rings can be joined by a direct link or a linking group selected from: aryl, heteroaryl, fused aryl, alkyl or haloalkyl groups of from 1 to 10 carbons, —O—, —S—,

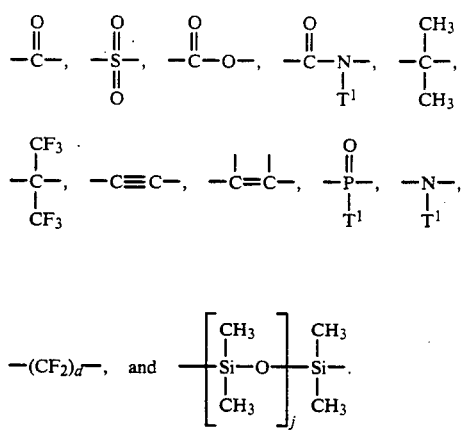

Each $R^1$ is independently selected from alkyl, aryl and heteroaryl; d is an integer from 1 to about 12; and j is an integer between 0 and 300. Suitable Ar groups include phenyl, biphenyl, naphthyl, anthracyl, thiophene, benzothiophene, pyridine, quinoline, furan, dibenzofuran, diarylethers, diarylcarbonyls, phenanthryl, phenylether, diphenylsulfone, diphenylketone, and diphenylsulfide.

The ester groups: —$COOR^1$ and —$COOR^2$ can be bonded to the same or different aromatic rings of Ar; the same is true of both halos; however, each ester group is ortho to its corresponding halo; —COOR1 is ortho to —$X^1$ and —$COOR^2$ is ortho to —$X^2$. The two

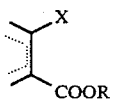

moieties are non-ortho. In other words,—$COOR^1$ and $X^1$ are both non-ortho to —$X^2$ and —$COOR^2$. $R^1$ and $R^2$ are independently selected from straight-chain and branched alkyl of from 1 to about 8 carbon atoms, and from the same groups as Ar, that is, the above-discussed aromatic and heteroaromatic moieties having from 1 to 3, solitary or linked or fused, substituted or unsubstituted, five or six membered rings. Examples of convenient $R^1$ and $R^2$ groups include one to eight carbon alkyl, phenyl, naphthyl, anthracyl, phenanthryl, biphenyl, pyridine, and quinoline. In a preferred embodiment of the invention, $R^1$ and $R^2$ are t-butyl groups.

Substituents of Ar, other than —$COOR^1$, $COOR^2$, —$X^1$, and —$X^2$, and any substituents of $R^1$ and $R^2$ are "unreactive", that is, although they may provide a selected functionality, they do not have a deleterious effect, for example, steric hindrance or electronic deactivation of the polymerization reaction. Additional substituents can be groups that introduce brancdhing, for example, additional bromo or iodo and ester groups, however, branching can affect the rheological and physical properties of the polymer. It is preferred that the total number of ester groups and the total number of associated ortho-halos be two Examples of suitable bis(o-(iodo or bromo)aromatic ester) reactants include reactants having the general structures shown in Table 1. In each of these general structures, either —X is $X^1$ and te other is $X^2$ and either —R is $R^1$ and the other is $R^2$. A specific compound exemplifying each structure is also given.

TABLE 1

| General structure | Specific example |
| --- | --- |
| | 2,5-diiododimethyl-terephthalate |
| | 4,6-diiododimethyl-isophthalate |
| | 2,5-dimethyl-3,6-diiodo-dimethylterephthalate |
| | 2,5-diphenyl-3,6-diiodo-diethylterephthalate |
| | 1,5-dicarbomethoxy-4,8-diiodonaphthalene |
| | 2,6-dicarbomethoxy-3,7-diiodonaphthalene |
| | 3,3'-dicarbomethoxy-4,4'-diiododiphenylether |
| | 4,4'-dicarbomethoxy-3,3'-diiodobenzophenone |
| | 2,2-bis(3-iodo-4-carbomethoxyphenyl)propane |

TABLE 1-continued

| General structure | Specific example |
| --- | --- |
| | 3,3'-diiodo-4,4'-dicarbo-tertbutoxy biphenyl |
| | 3,3'-diiodo-4,4'-dicarbo-methoxy-diphenylmethane |
| | 3,3'-diiodo-4,4'-dicarbo-phenoxy diphenylsulfone |
| | 2,2-bis(3-iodo-4-dicarboethoxyphenyl)hexafluoropropane |

The diamine reactant has a pair of non-ortho primary amino groups. The method of the invention is not limited to any particular diamine. The diamine used can include additional functional groups, as long as those gorups are "unreactive" in the sense presented above, that is, not having a deleterious effect, for example, steric hindrance or electronic deactivation of the polymerization reaction. Additional functional groups on the diamine can be groups that introduce branching, for exmaple, additional amino groups, however, branching can affect the rheological and physical properties of the polymer and the inclusion of such "branching groups" is not preferred. The diamine used can be aliphatic or aromatic or heteroaromatic. The particular diamine selected depends upon the polyimide desired.

Suitable diamines include: 1,4-diaminobenzene, 1,3-diaminobenzene, 4,4'-diaminodipheylether, 3,4'-diaminodiphenylether, 4,4'-diaminodiphenylmethane, 4,4'-diaminobenzophenone, 4,4'-diaminodiphenylsulfone, 2,2-bis(4-(4-aminophenoxy)phenyl)propane, 5-amino-3-(4-aminophenyl)-1,1,3-trimethylindane, 1,4-bis(2-(4-aminophenyl)propyl)benzene, 4,4'-bis(3-aminophenoxy)diphenylsulfone, 1,6-diaminohexane, and bis(3-aminopropyl)tetramethyldisiloxane.

Although reactants are discussed herein as individual compounds, the method of this application is not limited to reactions utilizing individual compounds as reactants, but is also inclusive of reactions utilizing mixtures of compounds as reactants. The method of the invention is not limited to any particular bis(ortho-(bromo or iodo)aromatic ester or combination of bis(ortho-(bromo or iodo)aromatic esters, nor to any particular diamine or combination of diamines, however it is necessary that selected reactants react under the reaction conditions employed to form the aromatic polyimide. It is desirable that the reactants be sufficiently stable under the reaction conditions employed and that the reactants not be subject to an unacceptable amount of undesirable side reactions, to prevent the formation of an unacceptable amount of by-product. It is also desirable that the reactants be free of groups which unduly retard the reaction by steric hindrance or by lowering the activity of the catalyst.

The reactants are contacted with carbon monoxide. It is convenient to add an excess of carbon monoxide to the reaction zone. The excess of carbon monoxide need not be measured; one can merely pressurize the vessel with carbon monoxide to the desired reaction pressure. Carbon monoxide can be at, or below atmospheric pressure or at a higher pressure. Examples of suitable carbon monoxide pressures are between 1 and 200 kg/cm$^2$, or more conveniently between 1 and 10 kg/cm$^2$.

In the disclosed embodiments of the invention, the reaction step is conducted in the presence of an organic solvent, which appreciably dissolves reactants to provide a liquid reaction medium, which facilitates the contacting of the reactants and the catalyst. It is desirable that the solvent be "inert" to the reaction, i.e., that the solvent not enter into the reaction in an undesired way. The invention is not limited to a particular solvent or solvent system and a wide variety of organic compounds can be used. In a particular embodiment of the invention, exemplary solvents are hydrocarbon solvents, such as toluene and ether solvents, for example: tetrahydrofuran, diglyme (2-methoxyethyl ether), and glyme (1,2-dimethoxyethane). In order to promote solubility of the polymer, it can be desirable to use a dipolar and aprotic solvent, that is, a solvent which has a highly polar molecule with hydrogens that are not easily abstractable. Exemplary dipolar aprotic solvents include dimethylformamide; dimethylacetamide; dimethylsulfoxide; 1,3-dimethyl-2-imidazolidinone; hexamethylphosphoramide; Nmethylpyrrolidinone; N-cyclohexylpyrrolidinone; and dimethylimidazolidinone.

The amount of solvent present is not critical to the reaction, however, it is desirable to use enough solvent to facilitate the reaction. Specific polymers may have optimum concentrations in various solvents. There is no theoretical upper limit on the amount of solvent employed, however, practical limits are imposed by the size of the reaction vessel, the ease of separation of product from the reaction medium, cost and other factors. It is ordinarily desirable that the amount of solvent used be within the range of from about 0.1 and about 1000 parts by weight based on the volume of bis(ortho-(bromo or iodo)aromatic ester reactant used. It is also ordinarily desirable that the reaction medium be agitated, for example, by stirring, to facilitate mixing of gaseous carbon monoxide.

The process of the invention is carried out in the presence of a catalyst. The catalyst is a transition metal catalyst in which platinum, nickel or palladium is present in the zero valent or divalent state. Palladium is preferred. The catalysts have one or more ligands bonded to one or more transition metal atoms by ionic or covalent bonds. Representative palladium catalysts include simple palladium salts such as PdX$_2$, in which X is Cl, Br or I and the other palladium catalysts listed in Table 2.

TABLE 2

| Palladium catalysts | |
|---|---|
| Pd$^{+2}$ | |
| PdX$_2$L$_2$ | X = Cl, Br, I |
| | L = R$_3$P, where R = alkyl or aryl |
| Pd(OAc)$_2$ | OAc = acetate |
| Pd(OAc)$_2$L$_2$ | OAc = acetate |
| PdCl$_2$(RCN)$_2$ | R = CH$_3$, Phenyl |
| PhPdXL$_2$ | X = Br, I |

TABLE 2-continued

| Palladium catalysts | |
|---|---|
| PdCl$_2$(COD)$_2$ | COD = cis, cis-1,5-cyclooctadiene |
| Pd(acac)$_2$ | acac = 2,4-pentanedionate |
| PdCl$_2$DPPF | DPPF = 1,1'-bis(diphenylphosphino)ferrocene |
| PdCl$_2$DPPE | DPPE = 1,2-bis(diphenylphosphino)ethane |
| PdCl$_2$DPPP | DPPP = 1,3-bis(diphenylphosphino)propane |
| PdCl$_2$DPPB | DPPB = 1,4-bis(diphenylphosphino)butane |
| Pd$^{(0)}$ | |
| PdL$_4$ | L = R$_3$P, where R = alkyl or aryl |

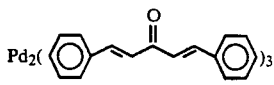

| | |
|---|---|
| Pd(DPPE)$_2$ | DPPE = 1,2-bis(diphenylphosphino)ethane |
| Pd(DPPP)$_2$ | DPPP = 1,3-bis(diphenylphosphino)propane |
| Pd(DPPB)$_2$ | DPPB = 1,4-bis(diphenylphosphino)butane |

A catalytic amount of catalyst is employed. By "catalytic amount" is meant an amount of catalyst which catalyzes the reaction to the desired extent. Generally, the amount of catalyst is at least about 0.01 mole percent based on the amount of bis(ortho(bromo or iodo)-)aromatic ester. There is no real upper or lower limit on the amount of catalyst, this being defined by secondary considerations such as cost and ease of separation of the catalyst from products and unreacted reactants. A preferred catalytic amount is from about 0.005 to about 0.20 moles per mole of bis(ortho-(bromo or iodo)-)aromatic ester reactant. The catalyst can be bound to a support or unsupported.

The reaction can take place in the presence of an activating ligand, such as phosphine or arsine ligand. Such a ligand can be used with a catalyst, for example, triphenylphosphine with bis(triphenylphosphine) palladium(II) chloride, to increase the rate of the catalyzed reaction. The amount of ligand used is desirably between about 0.01 mole and about 5.0 moles per mole of metal catalyst, and more desirably at about 2 moles per mole of metal catalyst. It is believed that the presence of the activating ligand speeds up the oxidative addition of such catalysts to the bis(ortho-(bromo or iodo)aromatic ester reactant by making the catalyst more nucleophilic.

The process of this invention preferably includes the neutralization of by-product hydrogen halide, for example, by conducting the reaction in the presence of base. The base can be a tertiary amine such as tributylamine, pyridine, 1,8-diazobicyclo[5,4,0]-7-undecene (DBU), 1,5diazobicyclo[4,3,0]non-5-ene (DBN) or have the formula:

NR$_3$ wherein each R is independently selected from lower alkyl groups having from about 2 to about 6 carbon atoms. The base can be immobilized on a crosslinked polymer such as cross-linked poly(vinylpyridine) beads. Alternatively, the base can be another type of basic substance which does not react with the reactants, e.g., a metal carbonate such as K$_2$CO$_3$ or a metal hydroxide such as Ca(OH)₂ or a metal acetate such as sodium acetate. Generally, one employs at least enough base to react with the by-product hydrogen halide produced. An excess can be used, if desired. As with the reactants, solvents and catalysts, a skilled practitioner will recognize that the exact structure of the base is not critical, and the examples of compounds set forth above are merely illustrative and not-limiting examples of materials that can be used in this invention. A skilled practitioner will recognize that other means can be substituted in this invention to achieve similar results.

The process of this invention is preferably conducted at a temperature within the range of from about room temperature, i.e., about 20° C., to about 250° C.. A desirable temperature range is from about 70° C. to about 150 ° C. A skilled practitioner will recognize that the reaction temperature is not critical, and that temperatures outside this range can be employed, if desired. Generally, one selects a reaction temperature which affords a reasonable rate of reaction and which does not give an undue amount of decomposition of products or reactants.

The reaction time is not a truly independent variable but is dependent at least to some extent on the other reaction parameters selected such as the reactivity of the reactants, activity and amount of catalyst, reaction temperature, pressure and so forth. Generally, reaction times within the range of from about 0.1 to about 100 hours are used.

The method of the invention is not limited by a particular theory or explanation, however, a theoretical explanation can be provided. It is believed that the method of the invention includes the following reaction mechanism sequence, in which the polymer formation step further comprises an oxidative addition step, a carbon monoxide insertion step and a coupling step. In that reaction sequence, a palladium(0) catalyst, which can be introduced as a palladium(0) complex or as a palladium(II) species which is subsequently reduced in situ, undergoes oxidative addition to a halide compound generating an aryl palladium(II) halide intermediate. The ligands on palladium can be CO, phosphines or amines. Since the palladium catalyst is present in small quantities relative to the halide compound, it is unlikely that bis(aryl palladium(II) halide) intermediates are formed to any great degree, but the oxidative addition reaction takes place at both halide groups of di(halide) compounds at some point during the reaction. Then CO insertion generates an acyl palladium(II) halide complex. This electrophilic acyl palladium complex is then attacked by the diamine in the coupling reaction. The hydrogen halide which is liberated is neutralized by the added base and the palladium(0) catalyst is regenerated. An intramolecular ring closure then occurs producing the imide and releasing an alcohol molecule. This mechanism sequence is illustrated below for the reaction of 3,3'-diiodo-4,4'-dicarbomethoxydiphenylmethane and 4,4'-diaminodiphenylether.

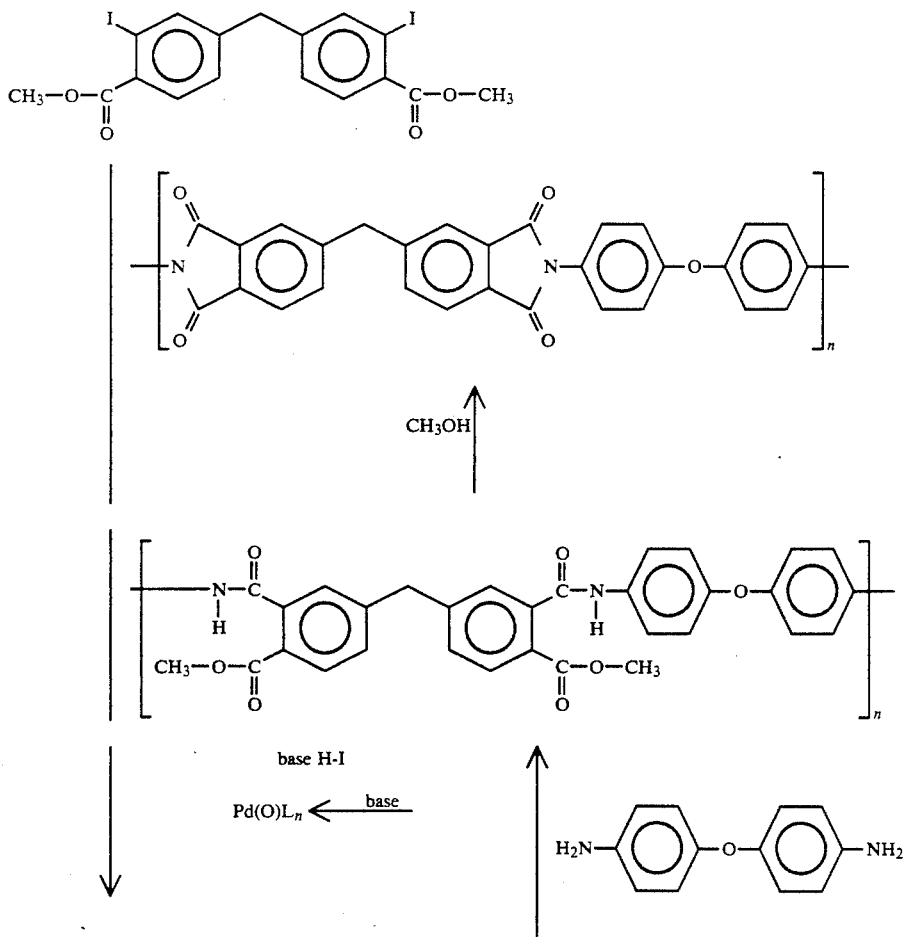

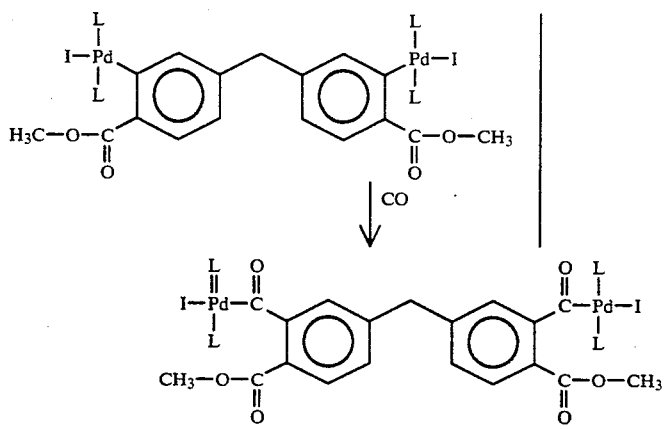

It is believed that the methanol liberated in the above reaction scheme reacts competitively with the amine, producing a dimethylphthalate derivative which effectively endcaps the polymers. Such endcapping could be utilized in the methods of the invention, but is generally undesirable. It is also believed that replacement of the methyl gruops in the bis(orhto-(bromo or iodo)-)aromatic ester reactant with groups that cause steric congestion, such as t-butyl groups, inhibits the undesired reaction of liberated alcohol with the palladium acyl complex.

The following Examples are presented for a further understanding of the invention. Table 3 lists reactants and other materials used, quantities and other information for all of the Examples.

EXAMPLE 1

A dry Fischer-Porter bottle equipped with a Teflon coated stir-bar was charged with bis(ohaloaromatic ester) reactant, diamine reactant, catalyst, ligand and solvent, as indicated in Table 3. The reaction mixture was degassed and placed under 1 atmosphere (1.0 kg/cm$^2$) of carbon monoxide. The base was added by syringe and the reaction vessel was pressurized to 7.7 kg/cm$^2$ with carbon monoxide. The reaction was allowed to continue for 7 hours at 115° C., after which time the mixture was filtered through filter aid, and precipitated into methanol. The polymer was washed extensively with methanol, and dried in vacuo to give 1.03 grams of polymer at a yield of 78%. Infrared spectra were recorded on a Nicolet 5ZDX spectrometer as KBr pellets. Size exclusion chromatography data was obtained using three Waters HT Linear columns and a 300 Angstrom HT column, calibrated against poly(methylmethacrylate) standards in dimethylformamide to obtain weight average and number average molecular weight determinations (also referred to herein as $M_w$ and $M_n$, respectively). Results are presented in Table 3.

EXAMPLE 2

The same procedures were followed and results are presented as in Example 1, with the exceptions that reactants differed, as indicated in Table 3 and the reaction was allowed to continue for 24 hours and gave 0.850 grams of polymer at a yield of 48%.

EXAMPLE 3

The same procedures were followed and results are presented as in Example 1, with the exceptions that reactants differed, as indicated in Table 3 and the reaction gave 315 milligrams of polymer at a yield of 21%.

TABLE 3

| | EXAMPLE | | | |
|---|---|---|---|---|
| | 1 | 2 | 3 | 4 |
| Bis(o-(haloaromatic ester) concentration (millimolar) | | | | |
| 3,3'-diiodo-4,4'-bis(carboxymethyl) diphenylmethane | 2.87 | 3.00 | — | — |
| 2,4-diiodomethyl-terephthalate | — | — | 3.00 | — |
| 2,5-diiodo-di-t-butyl terephthalate | — | — | — | 3.00 |
| Diamine concentration (millimolar) | | | | |
| 4,4'-diamino-diphenylether | 2.97 | — | — | — |
| 5-amino-3-(4-aminophenyl)-1,1,3-trimethylindane | — | 3.00 | 3.00 | 3.00 |
| Solvent volume (in milliliters) | | | | |
| Dimethylacetamide | 9.0 | 9.1 | 9.1 | 18.0 |
| Catalyst concentration (millimolar) | | | | |
| PdCl$_2$L$_2$ | 0.178 | 0.18 | 0.18 | 0.09 |
| Ligand concentration (millimolar) | | | | |
| PPh$_3$ | 0.256 | 0.36 | 0.36 | 0.18 |
| Base concentration (millimolar) | | | | |
| 1,8-diazabicyclo [5.4.0] undec-7-ene (DBU) | 7.13 | 7.2 | 7.2 | 7.2 |
| Temperature (°C.) | 115° | 115° | 115° | 115° |
| CO pressure (kg/cm$^2$) | 7.7 | 7.7 | 7.7 | 7.7 |
| Reaction time (in hours) | 7 | 24 | 7 | 24 |
| $M_w$ | 10,400 | 6,650 | 8,240 | 46,700 |
| $M_n$ | 7,150 | 5,200 | 6,170 | 21,100 |
| Infrared absorption peaks (in cm$^{-1}$) | | | | |
| | 1771 | 1776 | 1776 | 1778 |
| | 1720 | 1720 | 1727 | 1725 |
| | 1500 | 1512 | 1645 | 1646 |
| | 1377 | 1373 | 1606 | 1603 |
| | 1238 | | 1512 | 1511 |
| | | | 1364 | 1363 |

Table 4 shows proposed repeating unit structural formulas of polymers produced by the method of the invention.

TABLE 4

| Example | Polyimide repeating unit |
|---|---|
| 1 | (structure) |
| 2 | (structure) |
| 3 and 4 | (structure) |

The method of the invention provides the advantages of utilizing bis(orhto-()bromo or iodo))aromatic esters. These compounds are much less water sensitive than dianhydrides. The method of the invention can be carried out at a temperature between 100° and 120 °C.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto.

What is claimed is:

1. A method for preparing polyimides comprising reacting carbon monoxide, a primary diamine and a reactant selected from the group consisting of bis(o-iodoaromatic carboxylic acid ester)s and bis(o-bromoaromatic carboxylic acid ester)s, in the presence of solvent and catalyst, said catalyst being a compound of a metal selected from the group consisting of platinum, palladium and nickel.

2. The method of claim 1 further comprising neutralizing hydrogen halide.

3. The method of claim 1 wherein the amino groups of said primary diamine are non-ortho.

4. The method of claim 1 wherein said catalyst is a palladium catalyst.

5. The method of claim 1 wherein said bis(o-(iodo,-bromo)aromatic carobxylic acid ester) reactant has the generla structure

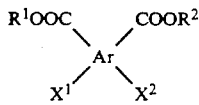

wherein $R^1$, $R^2$, $X^1$, and $X^2$ are each independently selected, $COOR^1$ is ortho to $X^1$ and $COOR^2$ is ortho to $X^2$, $COOR^1$ and $X^1$ are non-ortho to $X^2$ and $COOR^2$, $X^1$ and $X^2$ are each I or Br, $R^1$ and $R^2$ are each an alkyl group having from 1 to about 8 carbon atoms, or are independently selected from the group consisting of aromatic and heteroaromatic moieties having a total of ring carbons and heteroatoms of from 6 to about 30, and Ar is an aromatic or heteroaromatic moiety having from 1 to 3, solitary or linked or fused, five or six membered rings.

6. The method of claim 5 wherein $R^1$ and $R^2$ are each an alkyl group having from 4 to about 8 carbon atoms, or are independently selected from the group consisting of aromatic and heteroaromatic moieties having a total of ring carbons and heteroatoms of from 6 to about 30.

7. The method of claim 5 wherein $R^1$ and $R^2$ are each t-butyl.

8. The method of claim 1 wherein $R^1$ and $R^2$ are each independently selected from the group consisting of arylene and heteroarylene groups having five or six membered rings, fused systems of said rings, directly linked systems of said rings, or linked systems of said rings having bridge members selected from the group consisting of arylene, heteroarylene, fused arylene, alkyl or haloalkyl groups of from 1 to 10 carbons, —O—, —S—,

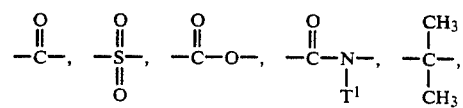

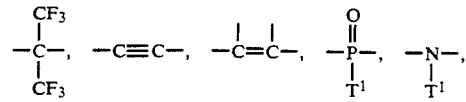

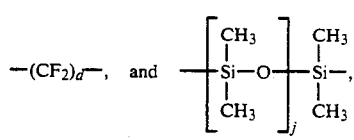

wherein each $T^1$ is independently selected from the group consisting of alkyl, aryl and heteroaryl; d is an integer from 1 to about 12; and j is an integer between 0 and 300.

9. The method of claim 1 wherein said bis(o-haloaromatic carboxylic acid ester) reactant has the general structure

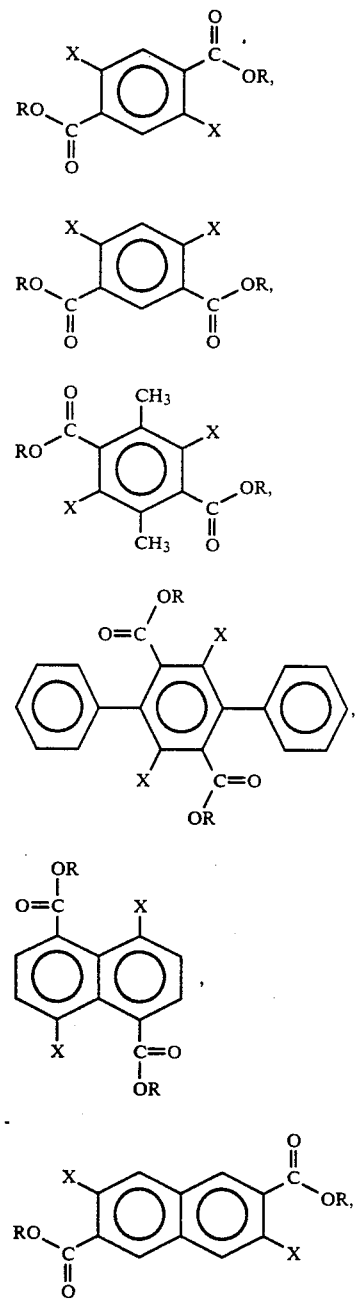

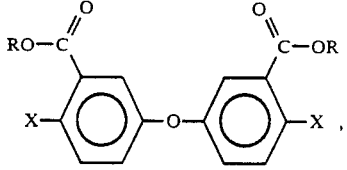

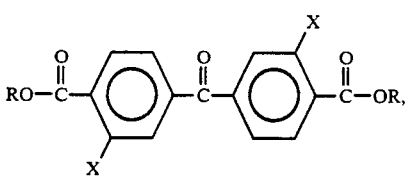

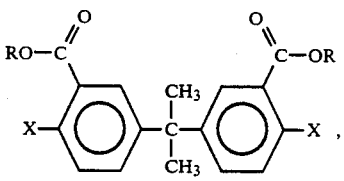

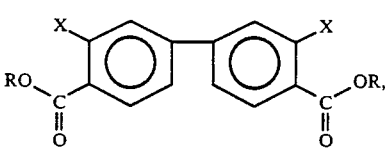

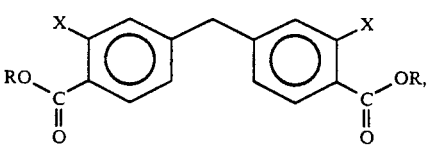

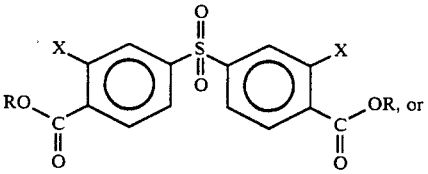

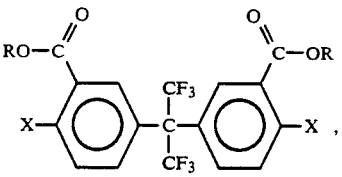

wherein each —COOr group is independently selected from the group consisting of methoxy, ethoxy, t-butoxy, and phenoxy, and each —X is independnetly selected from —Br and —I.

10. The method of claim 1 wherein said diamine reactant is selected from the group consisting of: 1,4-diaminobenzene; 1,3-diaminobenzene; 4,4'-diaminobenzophenone; 4,4'-diaminodiphenyl-methane; 2,2-bis(4-aminophenyl)propane; 9,9-bis(4-aminophenyl)fluorene; 4,4'-diamino-dipghenylether; 1,4[2-(4-aminophenyl)-2-propyl]benzene; 5-amino-3-(4-aminophenhyl)-1,1,3-trimethylindane; 2,2'-bis(trifluoromethyl)-4,4'-diaminobiphenyl; 3,4'-diaminodiphenylether; 4,4'-bis(4-aminophenoxy)biphenyl; 2,2-bis[4-(4-aminophenoxy)-phenyl]propane; 1,4-bis(4-aminophenoxy)benzene; 3,3'-diamino-diphenylsulfone; 4,4'-diamino-diphenylsufone; 2,2'-bis[4-(4-aminophenoxy)-phenyl]sulfone; 3,5- diamino-t-butylbenzene; 2,2-bis[4-(3-aminophenoxy)-phenyl]sulfone;

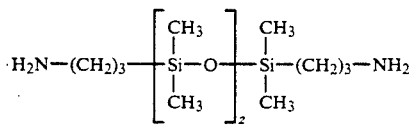

wherein z is an integer from 1 to about 50; $H_2N-(CH_2)_y-NH_2$, wherein y is an integer from 1 to 10.

11. The method of claim 1 wherein said bis(o-haloaromatic carboxylic acid ester) reactant has the general structure

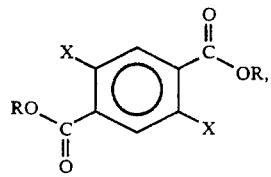

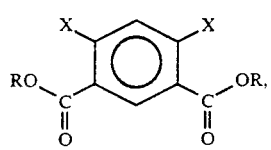

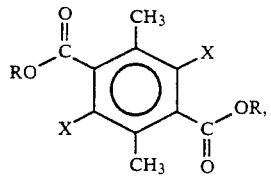

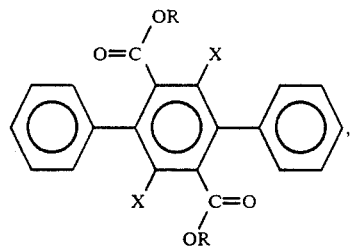

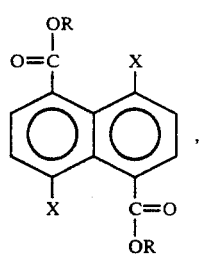

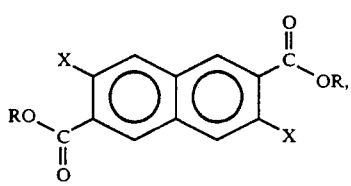

-continued

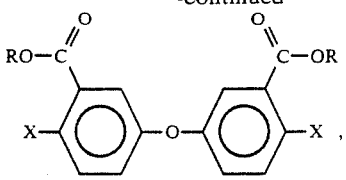

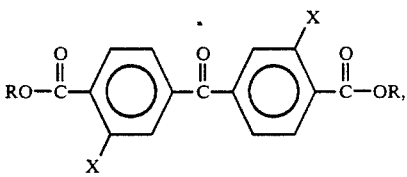

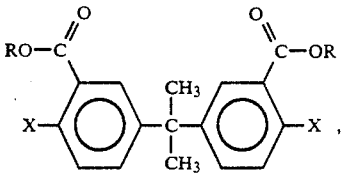

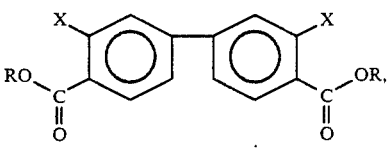

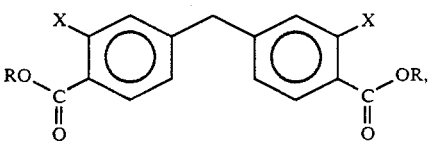

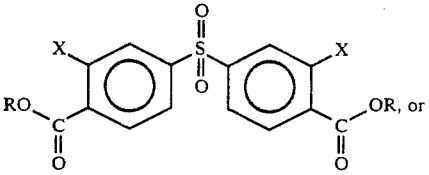

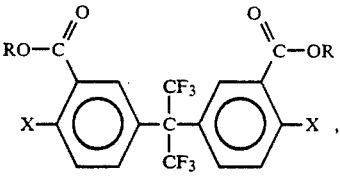

wherein each —COOR group is independently selected from the group consisting of methoxy, ethoxy, t-butoxy, and phenoxy, and each —X is independently selected form —Br and —I and said diamine reactant is selected from the group consisting of: 1,4-diaminobenzene; 1,3-diaminobenzene; 4,4'-diaminobenzophenone; 4,4'-diaminodiphenyl-methane; 2,2-bis(4-aminophenyl)-propane; 9,9-bis(4-aminophenyl)fluorene; 4,4'-diamino-dipghenylether; 1,4[2-(4-aminophenyl)-2-propyl]benzene; 5-amino-3-(4-aminophenhyl)-1,1,3-trimethylindane; 2,2'-bis(trifluoromethyl)-4,4'-diaminobiphenyl; 3,4'-diaminodiphenylether; 4,4'-bis(4-aminophenoxy)biphenyl; 2,2-bis[4-(4-aminophenoxy)-phenyl]propane; 1,4-bis(4-aminophenoxy)benzene; 3,3'-diamino-diphenylsulfone; 4,4'-diamino-diphenylsufone; 2,2'-bis[4-(4-aminophenoxy)-phenyl]sulfone; 3,5-diamino-t-butylbenzene; 2,2-bis[4-(3-aminophenoxy)-phenyl]sulfone;

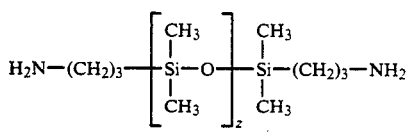

wherein z is an integer from 1 to about 50; $H_2N-(CH_{2y}-NH_2$, wherein y is an integer from 1 to 10.

12. The method of claim 1 comprising reacting at a temperature from about 70° to about 150° C.

13. The method of claim 1 wherein said catalyst is a palladium compound having a palladium atom in the zero valent or divalent state.

14. The method of claim 1 wherein said catalyst is selected from the group consisting of $PdCl_2$, $PdBr_2$, $PdI_2$, $PdCl_2(R^2{}_3P)_2$, $PdBr_2(R^1{}_3P)_2$, $PdI_2(R^1{}_3P)_2$, $Pd(R^2)_2$, $Pd(R^2)_2()R^1{}_3P)_2$, $PdCl_2(R^3CN)_2$, $PhPdBr(R^1{}_3P)_2$, $PhPdI(R^1{}_3P)_2$, $PdCl_2$(cis, cis-1,5-cyclooctadiene)$_2$, Pd(2,4-pentanedionate)$_2$,
 $PdCl_2$(1,1'-bis(diphenylphosphino)ferrocene),
 $PdCl_2$(1,2-bis(diphenylphosphino)ethane),
 $PdCl_2$(1,3-bis(diphenylphosphino)propane),
 $PdCl_2$(1,1-bis(diphenylphosphino)butane),
 $Rd(R^1{}_3P)_4$,

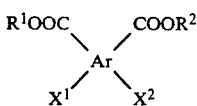

Pd(1,2-bis(diphenylphosphino)ethane)$_2$,
Pd(1,3-bis(diphenylphosphino)propane)$_2$, and
Pd(1,4-bis(diphenylphosphino)butane)$_2$,
wherein $R^1$ is alkyl or aryl, $R^2$ is acetate, and $R^3$ is $CH_3$ or phenyl.

15. A method for preparing polyimides comprising reacting carbon monoxide, a primary diamine and a bis(o-(iodo,bromo)aromatic carboxylic acid ester) reactant having the general structure

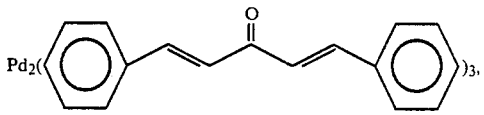

wherein $R^1$, $R^2$, $X^1$, and $X^2$ are each independently selected
 $COOR^1$ is ortho to $X^1$ and $COOR^2$ is ortho to $X^2$,
 $X^1$ and $X^2$ are each I or Br,
 $R^1$ and $R^2$ are each an alkyl group having from 1 to about 8 carbon atoms, or are independently selected from the group consisting of aromatic and heteroaromatic moieties having a total of ring carbons and heteroatoms of from 6 to about 30, and
 Ar is an aromatic or heteroaromatic moiety having from 1 to 3, solitary or linked or fused, five or six membered rings,
 in the presence of solvent and catalyst, said catalyst being a compound of a metal selected from the group consisting of platinum, palladium and nickel, and neutralizing hydrogen halide.

16. The method of claim 15 wherein said bis(o-haloaromatic carobxylic acid ester) reactant has the general structure

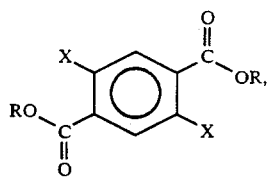

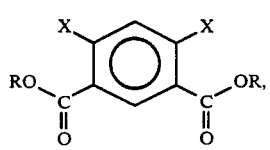

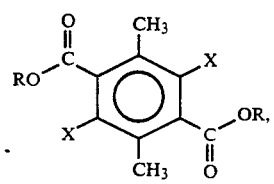

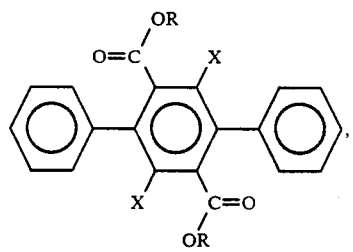

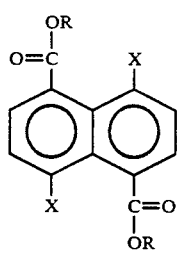

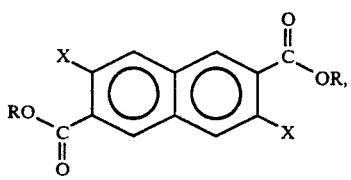

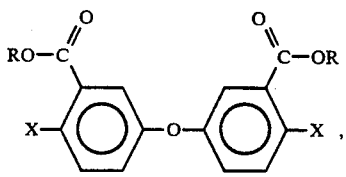

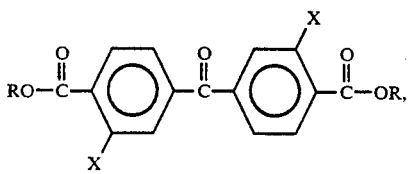

19
-continued

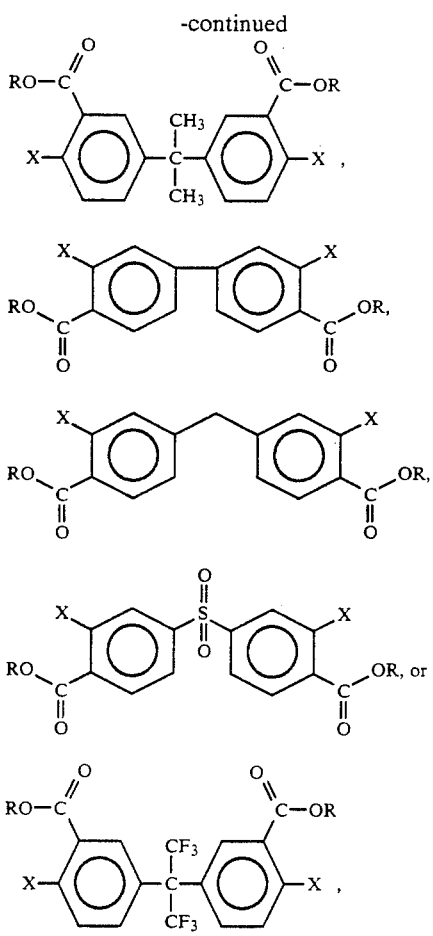

wherein each —COOR group is independently selected from the group consisting of methoxy, ethoxy, t-butoxy, and phenoxy, and each —X is independently selected from —Br and —I.

17. The method of claim 16 wherein said diamine reactant is selected from the group consisting of: 1,4-diaminobenzene; 1,3-diaminobenzene; 4,4'-diaminobenzophenone; 4,4'-diaminodiphenyl-methane; 2,2-bis(4-aminophenyl)propane; 9,9-bis(4-aminophenyl)fluorene; 4,4'-diamino-dipghenylether; 1,4[2-(4-aminophenyl)-2-propyl]benzene; 5-amino-3-(4-aminophenhyl)-1,1,3-trimethylindane; 2,2'-bis(trifluoromethyl)-4,4'-diaminobiphenyl; 3,4'-diaminodiphenylether; 4,4'-bis(4-aminophenoxy)biphenyl; 2,2-bis[4-(4-aminophenoxy)-phenyl]propane; 1,4-bis(4-aminophenoxy)benzene; 3,3'-diamino-diphenylsulfone; 4,4'-diamino-diphenylsufone; 2,2'-bis[4-(4-aminophenoxy)-phenyl]sulfone; 3,5-diamino-t-butylbenzene; 2,2-bis[4-(3-aminophenoxy)-phenyl]sulfone;

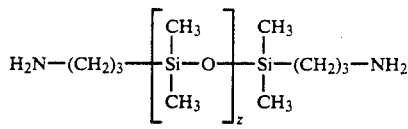

wherein z is an integer from 1 to about 50; H2N—(CH2y—NH2, wherein y is an integer from 1 to 10.

18. The method of claim 17 comprising reacting at a temperature from about 70° to about 150° C.

19. The method of claim 18 wherein said catalyst is a palladium compound having a palladium atom in the zero valent or divalent state.

20. The method of claim 19 wherein said catalyst is selected from the group consisting of PdCl$_2$, PdBr$_2$, PdI$_2$, PdCl$_2$(R$^2$$_3$P)$_2$, PdBr$_2$(R$^1$$_3$P)$_2$, PdI$_2$(R$^1$$_3$P)$_2$, Pd(R$^2$)$_2$, Pd(R$^2$)$_2$()R$^1$$_3$P)$_2$, PdCl$_2$(R$^3$CN)$_2$, PhPdBr(R$^1$$_3$P)$_2$, PhPdI(R$^1$$_3$P)$_2$, PdCl$_2$(cis, cis-1,5-cyclooctadiene)$_2$, Pd(2,4-pentanedionate)$_2$, PdCl$_2$(1,1'-bis(diphenylphosphino)ferrocene), PdCl$_2$(1,2-bis(diphenylphosphino)ethane), PdCl$_2$(1,3-bis(diphenylphosphino)propane), PdCl$_2$(1,1-bis(diphenylphosphino)butane), Rd(R$^1$$_3$P)$_4$,

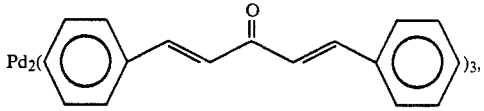

Pd(1,2-bis(diphenylphosphino)ethane)$_2$,
Pd(1,3-bis(diphenylphosphino)propane)$_2$, and
Pd(1,4-bis(diphenylphosphino)butane)$_2$,
wherein R$^1$ is alkyl or aryl, R$^2$ is acetate, and R$^3$ is CH$_3$ or phenyl.

* * * * *

UNITED STATES PATENT AND TRADEMARK OFFICE
CERTIFICATE OF CORRECTION

PATENT NO. : 5,216,118

DATED : June 1, 1993

INVENTOR(S) : Robert J. Perry, et al

It is certified that error appears in the above-indentified patent and that said Letters Patent is hereby corrected as shown below:

Column 14, line 52 reads: "wherein each -COOr group is independently selected"
 Column 14, line 52 should read: -- wherein each -COOR group is independently selected --

Column 14, line 61 reads: "4,4'-diamino-dipghenylether; 1,4[2-(4-aminophenyl)-2-"
 Column 14, line 61 should read: --4,4'-diamino-dcphenylether; 1,4[2-(4-aminophenyl)-2- --

Column 14, line 62 reads: "propyl]benzene; 5-amino-4-(4-aminophenhyl)-1,1,3-"
 Column 14, line 62 should read: --propyl]benzene; 5-amino-4-(4-aminophenyl)-1,1,3- --

Column 14, line 67 reads: "diamino-diphenylsulfone; 4,4'-diamino-diphenylsufone;"
 Column 14, line 67 should read: --diamino-diphenylsulfone; 4,4'-diamino-diphenylsulfone;"

Column 15, line 13 reads: "$H_{2y}$-NH2, wherein y is an integer from 1 to 10."
 Column 15, line 13 should read: --$H_2N-(CH_2)y$-NH2, wherein y is an integer from 1 to 10.--

UNITED STATES PATENT AND TRADEMARK OFFICE
CERTIFICATE OF CORRECTION

PATENT NO. : 5,216,118
DATED : June 1, 1993
INVENTOR(S) : Robert J. Perry, et al It is certified that error appears in the above-indentified patent and that said Letters Patent is hereby corrected as shown below:

Column 16, line 61 reads: "diamino-dipghenylether; 1,4[2-(4-aminophenyl)-2-"
Column 16, line 61 should read: --diamino-diphenylether; 1,4[2-(4-aminophenyl)-2- --

Column 16, line 62 reads: "propyl]benzene; 5-amino-3-(4-aminophenhyl)-"
Column 16, line 62 should read: --propyl]benzene; 5-amino-3-(4-aminophenyl)- --

Column 16, line 68 reads: "4,4'-diamino-diphenylsufone; 2,2'-bis[4-(4-amino-"
Column 16, line 68 should read: --4,4'-diamino-diphenylsulfone; 2,2'-bis[4-(4-amino- --

Column 17, line 12 reads: "$H_{2y}$-NH2, wherein y is an integer from 1 to 10."
Column 17, line 12 should read: --$H_2N-(CH_2)y$-NH2, wherein y is an integer from 1 to 10.--

UNITED STATES PATENT AND TRADEMARK OFFICE
CERTIFICATE OF CORRECTION

PATENT NO. : 5,216,118

DATED : June 1, 1993

INVENTOR(S) : Robert J. Perry, et al

It is certified that error appears in the above-indentified patent and that said Letters Patent is hereby corrected as shown below:

Column 17, line 20 reads: "$PdI_2$, $PdCl_2(R^2{}_3P)_2$, $PdBr_2(R^1{}_3P)_2$, $PdI_2(R^1{}_3P)_2$,"
Column 17, line 20 should read: --$PdI_2$, $PdCl_2(R^1{}_3P)_2$, $PdBr_2(R^1{}_3P)_2$, $PdI_2(R^1{}_3P)_2$, Column 17, line 21 reads: "$Pd(R^2)_2$, $Pd(R^2)_2()R^1{}_3P)_2$, $PdCl_2(R^3CN)_2$,"
Column 17, line 21 should read: --$Pd(R^2)_2$, $Pd(R^2)_2(R^1{}_3P)_2$, $PdCl_2(R^3CN)_2$,--

Column 17, line 28 reads: "$PdCl_2$(1,1-bis(diphenylphosphino)-butane),"
Column 17, line 28 should read: --$PdCl_2$(1,4-bis(diphenylphosphino)butane),--

Column 19, line 46 reads: "4,4'-diamino-dipghenylether; 1,4[2-(4-aminophenyl)-2-"
Column 19, line 46 should read: --4,4'-diamino-diphenylether; 1,4[2-(4-aminophenyl)-2- --

Column 19, line 47 reads: "propyl]benzene; 5-amino-3-(4-aminophenhyl)-1,1,3-"
Column 19, line 47 should read: --propyl]benzene; 5-amino-3-(4-aminophenyl)-1,1,3- --

UNITED STATES PATENT AND TRADEMARK OFFICE
CERTIFICATE OF CORRECTION

PATENT NO. : 5,216,118

DATED : June 1, 1993

INVENTOR(S) : Robert J. Perry, et al

It is certified that error appears in the above-indentified patent and that said Letters Patent is hereby corrected as shown below:

Column 20, line 5 reads: "diamino-diphenylsulfone; 4,4'-diamino-diphenylsufone;"
Column 20, line 5 should read: --diamino-diphenylsulfone; 4,4'-diamino-diphenylsulfone;--

Column 20, line 18 reads: "$H_{2y}$-NH2, wherein y is an integer from 1 to 10."
Column 20, line 18 should read: --$H_2N-(CH_2)y-NH2$, wherein y is an integer from 1 to 10.--

Column 20, line 26 reads: "$PdI_2$, $PdCl_2(R^2{}_3P)_2$, $PdBr_2(R^1{}_3P)_2$, $PdI_2(R^1{}_3P)_2$,"
Column 20, line 26 should read: --$PdI_2$, $PdCl_2(R^1{}_3P)_2$, $PdBr_2(R^1{}_3P)_2$, $PdI_2(R^1{}_3P)_2$,--

Column 20, line 27 reads: "$Pd(R^2)_2$, $Pd(R^2)_2()R^1{}_3P)_2$, $PdCl_2(R^3CN)_2$,"
Column 20, line 27 should read: --$Pd(R^2)_2$, $Pd(R^2)_2(R^1{}_3P)_2$, $PdCl_2(R^3CN)_2$,--

UNITED STATES PATENT AND TRADEMARK OFFICE
CERTIFICATE OF CORRECTION

PATENT NO. : 5,216,118

DATED : June 1, 1993

INVENTOR(S) : Robert J. Perry, et al

It is certified that error appears in the above-indentified patent and that said Letters Patent is hereby corrected as shown below:

Column 20, line 33 reads: "$PdCl_2$(1,1-bis(diphenylphosphino)-butane),"

Column 20, line 33 should read: --$PdCl_2$(1,4-bis(diphenylphosphino)butane),--

Signed and Sealed this

Eighth Day of February, 1994

BRUCE LEHMAN

Attest:

Attesting Officer

Commissioner of Patents and Trademarks